(12) United States Patent
Green et al.

(10) Patent No.: US 8,675,332 B1
(45) Date of Patent: *Mar. 18, 2014

(54) THERMALLY PROTECTED LIGHT EMITTING DIODE MODULE

(71) Applicants: Russell Bryant Green, Douglasville, GA (US); Terence JaMal Clarke, Roswell, GA (US)

(72) Inventors: Russell Bryant Green, Douglasville, GA (US); Terence JaMal Clarke, Roswell, GA (US)

(73) Assignee: Cooper Technologies Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/848,610

(22) Filed: Mar. 21, 2013

Related U.S. Application Data

(63) Continuation of application No. 12/775,757, filed on May 7, 2010, now Pat. No. 8,405,947.

(51) Int. Cl.
*H02H 5/00* (2006.01)

(52) U.S. Cl.
USPC .......................................... 361/103

(58) Field of Classification Search
USPC .......................................... 361/103
See application file for complete search history.

(56) References Cited

U.S. PATENT DOCUMENTS

| | | | |
|---|---|---|---|
| 7,619,368 B2 * | 11/2009 | Lu | 315/209 R |
| 7,659,672 B2 | 2/2010 | Yang | |
| 7,812,550 B2 | 10/2010 | Harmgardt et al. | |
| 8,405,947 B1 * | 3/2013 | Green et al. | 361/103 |

* cited by examiner

*Primary Examiner* — Stephen W Jackson
(74) *Attorney, Agent, or Firm* — King & Spalding LLP

(57) ABSTRACT

A recessed light fixture includes a thermally protected light emitting diode ("LED") module. The thermally protected LED module includes a thermal protector positioned in series between a source of electrical power and an LED driver and is configured to open a circuit to prevent power from being supplied by the power source to the LED driver for an LED package when a thermal rating or activation temperature of the thermal protector is exceeded. For example, the maximum operating temperature of the LED driver may be 90 degrees Celsius, and the thermal rating of the thermal protector may be 80 degrees Celsius, and when the temperature of the driver or a mounting bracket upon which the driver is mounted reaches 80 degrees Celsius, the thermal protector opens a circuit and removes current flow from the power source to the driver, thereby removing power to the LED package.

20 Claims, 14 Drawing Sheets

THERMALLY PROTECTED LIGHT EMITTING DIODE MODULE

CROSS-REFERENCE TO RELATED APPLICATIONS

This patent application is a continuation application of and claims priority to U.S. patent application Ser. No. 12/775,757, titled "Thermally Protected Light Emitting Diode Module," and filed on May 7, 2010. This application is also related to U.S. patent application Ser. No. 12/235,116, titled "Light Emitting Diode Recessed Light Fixture," filed Sep. 22, 2008, and U.S. patent application Ser. No. 12/235,146, titled "Thermal Management for Light Emitting Diode Fixture," filed Sep. 22, 2008. The complete disclosure of each of the foregoing related applications is hereby fully incorporated herein by reference.

TECHNICAL FIELD

The invention relates generally to thermal protection of luminaires, and more particularly, to thermal protection of a light emitting diode module of a downlight can fixture for a recessed luminaire.

BACKGROUND OF THE INVENTION

A luminaire is a system for producing, controlling, and/or distributing light for illumination. For example, a luminaire can include a system that outputs or distributes light into an environment, thereby allowing certain items in that environment to be visible. Luminaires are often referred to as "light fixtures".

A recessed light fixture is a light fixture that is installed in a hollow opening in a ceiling or other surface. A typical recessed light fixture includes hanger bars fastened to spaced-apart ceiling supports or joists. A plaster frame extends between the hanger bars and includes an aperture configured to receive a lamp housing or "can" fixture.

Traditional recessed light fixtures include a lamp socket coupled to the plaster frame and/or the can fixture. The lamp socket receives an incandescent lamp or compact fluorescent lamp ("CFL") discussed above. As is well known in the art, the traditional lamp screws into the lamp socket to complete an electrical connection between a power source and the lamp.

Increasingly, lighting manufacturers are being driven to produce energy efficient alternatives to incandescent lamps. One such alternative was the CFL discussed above. CFLs fit in existing incandescent lamp sockets and generally use less power to emit the same amount of visible light as incandescent lamps. However, CFLs include mercury, which complicates disposal of the CFLs and raises environmental concerns.

Another mercury-free alternative to incandescent lamps is the light emitting diode ("LED"). LEDs are solid state lighting devices that have higher energy efficiency and longevity than both incandescent lamps and CFLs. However, LEDs do not fit in existing incandescent lamp sockets and generally require complex electrical and thermal management systems. Therefore, traditional recessed light fixtures have not used LED light sources. Furthermore, traditional light fixtures typically use insulation detectors in new construction and retrofit applications. Insulation Detectors are thermal switches with directly heated bi-metals, and are calibrated such that when covered with one inch of insulation, sufficient heat is produced to open the switch and interrupt power to the fixture. However, the insulation protectors are not typically universal voltage, for example, they may not able to receive two different line voltages, and therefore may require two separate housings for various voltage applications. In some new construction applications, thermal protectors are placed on the housings of the light fixtures for thermal management. Placing the thermal protectors on the housings protect the housing and its surroundings by limiting the temperature of the housing. However, thermal protectors on the housing of the light fixtures have not been successful to date in thermal protection, since the LED modules may not radiate enough heat to the housing to trip a housing mounted thermal protector, even if a component of the LED module, such as the driver, exceeds its thermal limit. For example, if the thermal protector is mounted to a lower side of the housing, and the orientation of the LED module is such that the driver is far from the thermal protector, the thermal protector may not trip before the driver reaches its thermal limit.

SUMMARY

The invention provides a recessed light fixture with an LED light source. The light fixture includes a housing or "can" within which an LED module is mounted. The LED module includes a single LED package that generates all or substantially all the light emitted by the recessed light fixture. For example, the LED package can include one or more LEDs mounted to a common substrate. Each LED is an LED die or LED element that is configured to be coupled to the substrate. The LEDs can be arranged in any of a number of different configurations. For example, the LEDs can be arranged in a round-shaped area having a diameter of less than two inches or a rectangular-shaped area having a length of less than two inches and a width of less than two inches.

The LED package can be thermally coupled to a heat sink configured to transfer heat from the LEDs. The heat sink can have any of a number of different configurations. For example, the heat sink can include a core member extending away from the LED package and fins extending from the core member. Each fin can include a curved, radial portion and/or a straight portion. For example, each fin can include a radial portion that extends from the core member, and a straight portion that further extends out from the radial portion. In this configuration, heat from the LEDs can be transferred along a path from the LEDs to the core member, from the core member to the radial portions of the fins, from the radial portions of the fins to their corresponding straight portions, and from the corresponding straight portions to a surrounding environment. Heat also can be transferred by convection directly from the core member and/or the fins to one or more gaps between the fins. The LED package can be coupled directly to the core member or to another member disposed between the LED package and the core member.

The LED module can be used in both new construction and retrofit applications. The retrofit applications can include placing the LED module in an existing LED or non-LED fixture. To accommodate installation in a non-LED fixture, the LED module can further include a member comprising a profile that substantially corresponds to an interior profile of a can of the non-LED fixture such that the member creates a junction box between the member and a top of the can when the LED module is mounted in the can. To install the LED module, a person can electrically couple an Edison base adapter to both the existing, non-LED fixture and the LED module. For example, a person can cut at least one wire to remove an Edison base from the existing fixture, cut at least one other wire to remove an Edison screw-in plug from the Edison base adapter, and connect together the cut wires to electrically couple the Edison base adapter and the existing fixture. Alternatively, a person can release a socket from the existing fixture and screw the Edison base adapter into the socket to electrically couple the Edison base adapter and the existing fixture. The junction box can house the Edison base adapter and at least a portion of the wires coupled thereto.

A thermally protected LED module can be used in new installation and retrofit installation applications. The thermally protected LED module can include a thermal protector, such as a thermal switch, electrically coupled to an LED driver and a power source to create a circuit from the power source to the driver. The thermal protector can be mounted to a mounting bracket that the driver is mounted to, or to the driver itself. Alternatively, the thermal protector may be "floating" and measure the temperature in an area proximate to the driver and/or the mounting bracket. The thermal protector can include a thermal rating that, when exceeded, opens the circuit and removes current flowing from the power source to the driver. For example, the thermal protector can activate when the temperature being monitored by the thermal protector is at least 10 degrees Celsius below a maximum operating temperature of the driver. In some instances, the thermal protector can be activated when the temperature of the mounting bracket reaches 80 degrees Celsius. An insulating sleeve, such as a plastic cover, can enclose the thermal protector and prevent the thermal protector from contacting other metal parts and shorting the circuit. The thermally protected LED module can also include a thermal protector cover, or clip, having a cavity in which the thermal protector is positioned and secured. In some instances, the thermal protector cover includes a tab that applies a force on the thermal protector sufficient to maintain physical contact between the thermal protector and the driver or mounting bracket surface.

These and other aspects, features and embodiments of the invention will become apparent to a person of ordinary skill in the art upon consideration of the following detailed description of illustrated embodiments exemplifying the best mode for carrying out the invention as presently perceived.

BRIEF DESCRIPTION OF THE DRAWINGS

For a more complete understanding of the present invention and the advantages thereof, reference is now made to the following description, in conjunction with the accompanying figures briefly described as follows.

DETAILED DESCRIPTION OF EXEMPLARY EMBODIMENTS

Figure 1:
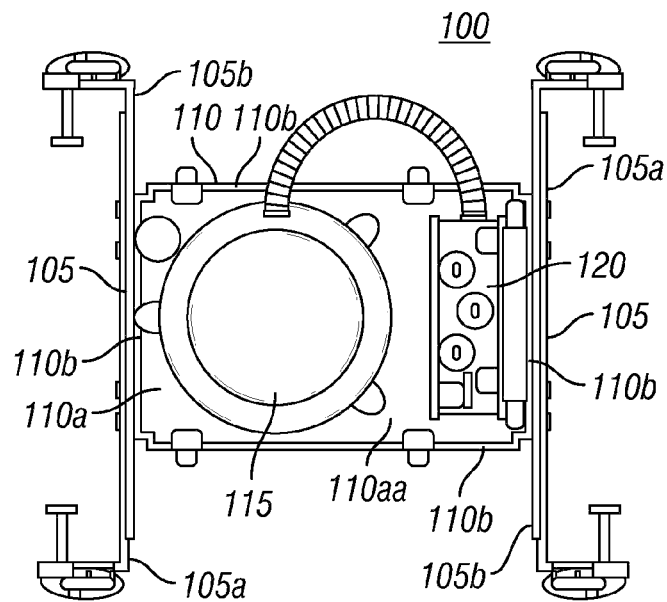
FIG. 1 is an elevational top view of hanger bars, a plaster frame, a can, and a junction box of a recessed lighting fixture, in accordance with certain exemplary embodiments.
Figure 2:
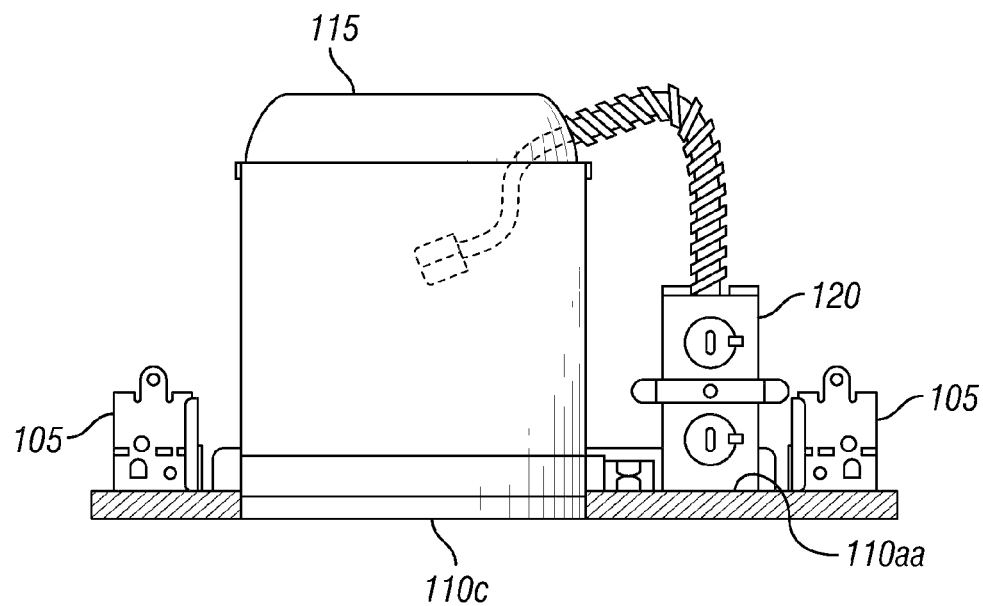
FIG. 2 is an elevational cross-sectional side view of the recessed lighting fixture of FIG. 1, in accordance with certain exemplary embodiments.
Figure 3:
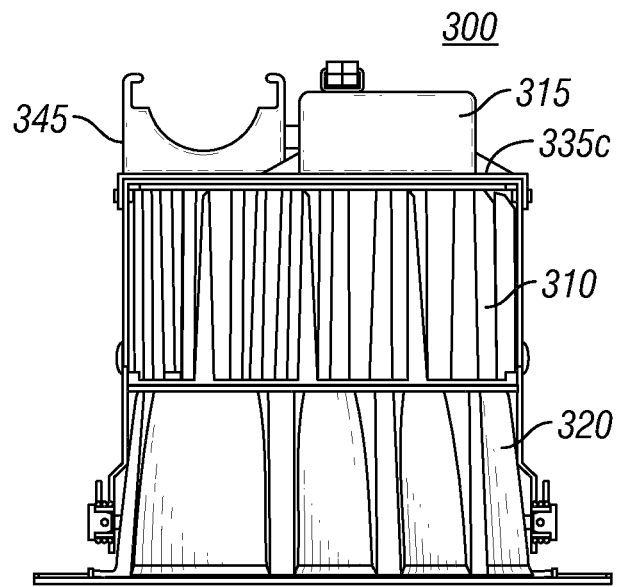
FIG. 3 is an elevational side view of an LED module of a recessed lighting fixture, in accordance with certain exemplary embodiments.
Figure 4:
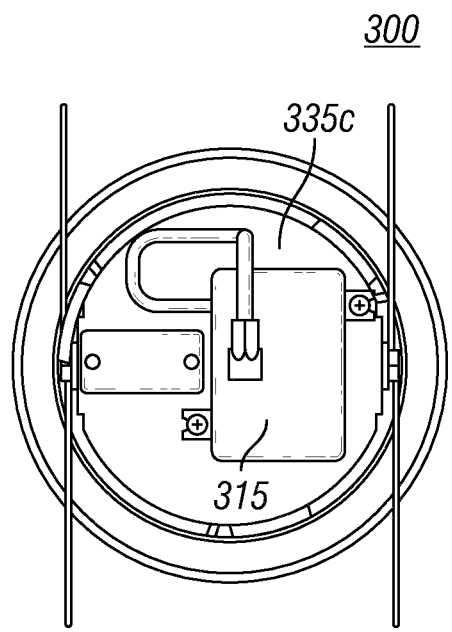
FIG. 4 is an elevational top view of the LED module of FIG. 3, in accordance with certain exemplary embodiments.
Figure 5:
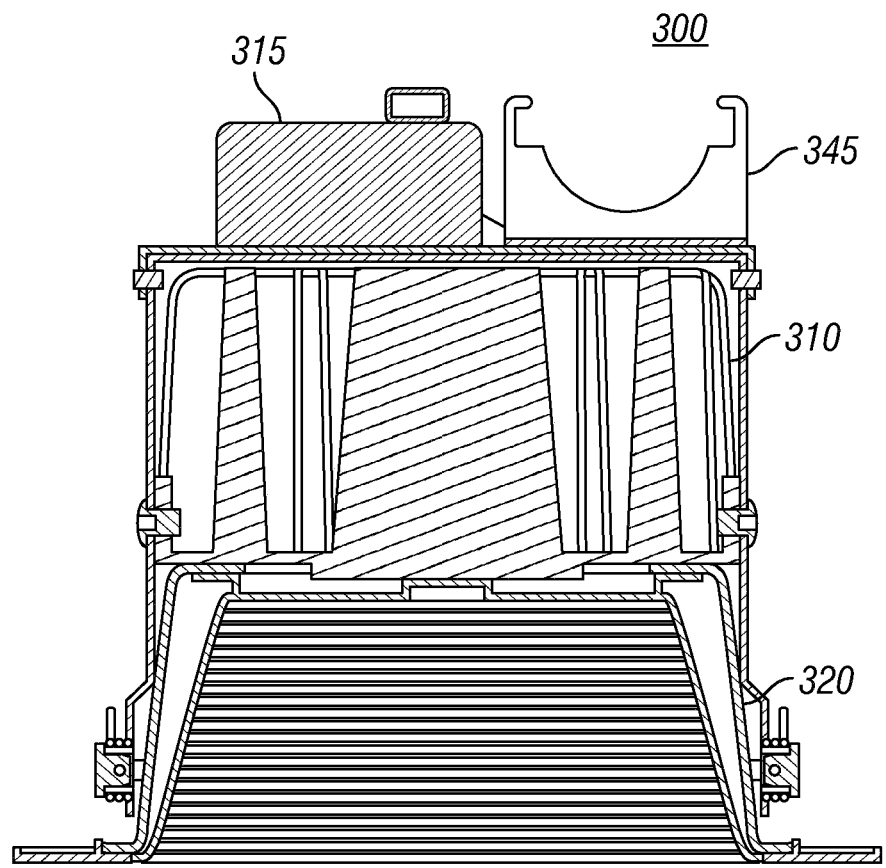
FIG. 5 is an elevational cross-sectional side view of the LED module of FIG. 3, in accordance with certain exemplary embodiments.
Figure 6:
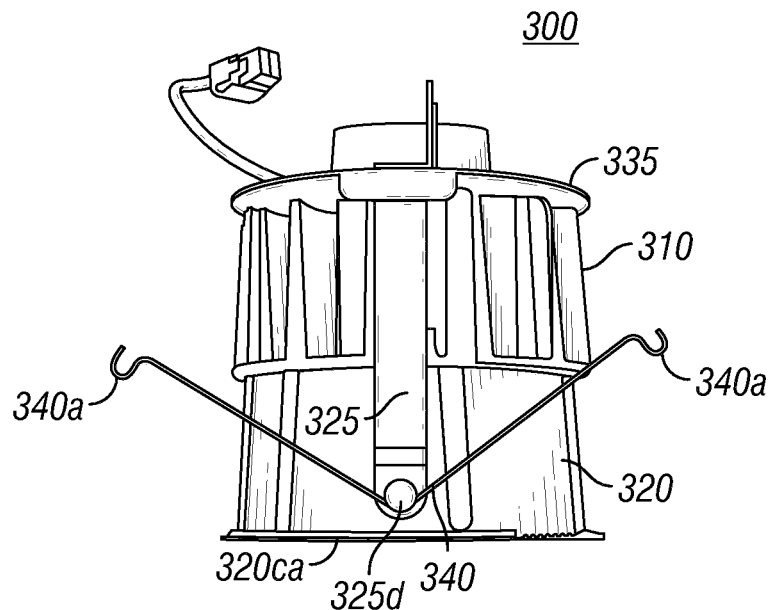
FIG. 6 is a perspective side view of the LED module of FIG. 3, in accordance with certain exemplary embodiments.

The following description of exemplary embodiments refers to the attached drawings, in which like numerals indicate like elements throughout the several figures. FIG. 1 is an elevational top view of hanger bars 105, a plaster frame 110, a can-shaped receptacle for housing a light source (a "can") 115, and a junction box 120 of a recessed lighting fixture 100, according to certain exemplary embodiments. FIG. 2 is an elevational cross-sectional side view of the hanger bars 105, plaster frame 110, can 115, and junction box 120 of the recessed lighting fixture 100 of FIG. 1, in accordance with certain exemplary embodiments. With reference to FIGS. 1 and 2, the hanger bars 105 are configured to be mounted between spaced supports or joists (not shown) within a ceiling (not shown). For example, ends of the hanger bars 105 can be fastened to vertical faces of the supports or joists by nailing or other means. In certain exemplary embodiments, the hanger bars 105 can include integral fasteners for attaching the hanger bars 105 to the supports or joists, substantially as described in co-pending U.S. patent application Ser. No. 10/090,654, titled "Hanger Bar for Recessed Luminaires with Integral Nail," and U.S. patent application Ser. No. 12/122,945, titled "Hanger Bar for Recessed Luminaires with Integral Nail," the complete disclosures of which are hereby fully incorporated herein by reference.

The distance between the supports or joists can vary to a considerable degree. Therefore, in certain exemplary embodiments, the hanger bars 105 can have adjustable lengths. Each hanger bar 105 includes two inter-fitting members 105*a* and 105*b* that are configured to slide in a telescoping manner to provide a desired length of the hanger bar 105. A person of ordinary skill in the art having the benefit of the present disclosure will recognize that many other suitable means exist for providing adjustable length hanger bars 105. For example, in certain alternative exemplary embodiments, one or more of the hanger bars described in U.S. Pat. No. 6,105,918, titled "Single Piece Adjustable Hanger Bar for Lighting Fixtures," the complete disclosure of which is hereby fully incorporated herein, may be utilized in the lighting fixture 100 of FIG. 1.

The plaster frame 110 extends between the hanger bars 105 and includes a generally rectangular, flat plate 110*a* with upturned edges 110*b*. For example, the flat plate 110*a* can rest on a top surface of the ceiling. The junction box 120 is mounted to a top surface 110*aa* of the flat plate 110*a*. The junction box 120 is a box-shaped metallic container that typically includes insulated wiring terminals and knock-outs for connecting external wiring (not shown) to an LED driver (not shown) disposed within the can 115 of the light fixture 100 or elsewhere within the light fixture 100.

In certain exemplary embodiments, the plaster frame 110 includes a generally circular-shaped aperture 110*c* sized for receiving at least a portion of the can 115 therethrough. The can 115 typically includes a substantially dome-shaped member configured to receive an LED module (not shown) that includes at least one LED light source (not shown). The aperture 110*c* provides an illumination pathway for the LED light source. A person of ordinary skill in the art having the benefit of the present disclosure will recognize that, in certain alternative exemplary embodiments, the aperture 110*c* can have another, non-circular shape that corresponds to an outer profile of the can 115.

FIGS. 3-8 illustrate an exemplary LED module 300 of the recessed lighting fixture 100 of FIG. 1. The exemplary LED module 300 can be configured for installation within the can 115 of the lighting fixture 100 of FIG. 1. The LED module 300 includes an LED package 305 mounted to a heat sink 310. The LED package 305 may be mounted directly to the heat sink 310 or with one or more other components mounted in-between the LED package 305 and the heat sink 310.

The LED package 305 includes one or more LEDs mounted to a common substrate 306. The substrate 306 includes one or more sheets of ceramic, metal, laminate, circuit board, mylar, or another material. Each LED includes a chip of semi-conductive material that is treated to create a positive-negative ("p-n") junction. When the LED package 305 is electrically coupled to a power source, such as a driver 315, current flows from the positive side to the negative side of each junction, causing charge carriers to release energy in the form of incoherent light.

The wavelength or color of the emitted light depends on the materials used to make the LED package 305. For example, a blue or ultraviolet LED can include gallium nitride ("GaN") or indium gallium nitride ("InGaN"), a red LED can include aluminum gallium arsenide ("AlGaAs"), and a green LED can include aluminum gallium phosphide ("AlGaP"). Each of the LEDs in the LED package 305 can produce the same or a distinct color of light. For example, the LED package 305 can include one or more white LED's and one or more non-white LEDs, such as red, yellow, amber, or blue LEDs, for adjusting the color temperature output of the light emitted from the fixture 100. A yellow or multi-chromatic phosphor may coat or otherwise be used in a blue or ultraviolet LED to create blue and red-shifted light that essentially matches blackbody radiation. The emitted light approximates or emulates "white," incandescent light to a human observer. In certain exemplary embodiments, the emitted light includes substantially white light that seems slightly blue, green, red, yellow, orange, or some other color or tint. In certain exemplary embodiments, the light emitted from the LEDs in the LED package 305 has a color temperature between 2500 and 5000 degrees Kelvin.

In certain exemplary embodiments, an optically transmissive or clear material (not shown) encapsulates at least a portion of the LED package 305 and/or each LED therein. This encapsulating material provides environmental protection while transmitting light from the LEDs. For example, the encapsulating material can include a conformal coating, a silicone gel, a cured/curable polymer, an adhesive, or some other material known to a person of ordinary skill in the art having the benefit of the present disclosure. In certain exemplary embodiments, phosphors are coated onto or dispersed in the encapsulating material for creating white light. In certain exemplary embodiments, the white light has a color temperature between 2500 and 5000 degrees Kelvin.

In certain exemplary embodiments, the LED package 305 includes one or more arrays of LEDs that are collectively configured to produce a lumen output from 1 lumen to 5000 lumens in an area having less than two inches in diameter or in an area having less than two inches in length and less than two inches in width. In certain exemplary embodiments, the LED package 305 is a CL-L220 package, CL-L230 package, CL-L240 package, CL-L102 package, or CL-L190 package manufactured by Citizen Electronics Co., Ltd. By using a single, relatively compact LED package 305, the LED module 300 has one light source that produces a lumen output that is equivalent to a variety of lamp types, such as incandescent lamps, in a source that takes up a smaller volume within the fixture. Although illustrated in FIGS. 7 and 8 as including LEDs arranged in a substantially square geometry, a person of ordinary skill in the art having the benefit of the present disclosure will recognize that the LEDs can be arranged in any geometry. For example, the LEDs can be arranged in circular or rectangular geometries in certain alternative exemplary embodiments.

The LEDs in the LED package 305 are attached to the substrate 306 by one or more solder joints, plugs, epoxy or bonding lines, and/or other means for mounting an electrical/optical device on a surface. Similarly, the substrate 306 is mounted to a bottom surface 310*a* of the heat sink 310 by one or more solder joints, plugs, epoxy or bonding lines, and/or other means for mounting an electrical/optical device on a surface. For example, the substrate 306 can be mounted to the heat sink 310 by a two-part arctic silver epoxy.

The substrate 306 is electrically connected to support circuitry (not shown) and/or the driver 315 for supplying electrical power and control to the LED package 305. For example, one or more wires (not shown) can couple opposite ends of the substrate 306 to the driver 315, thereby completing a circuit between the driver 315, substrate 306, and LEDs.

In certain exemplary embodiments, the driver 315 is configured to separately control one or more portions of the LEDs to adjust light color or intensity.

As a byproduct of converting electricity into light, LEDs generate a substantial amount of heat that raises the operating temperature of the LEDs if allowed to accumulate. This can result in efficiency degradation and premature failure of the LEDs. The heat sink 310 is configured to manage heat output by the LEDs in the LED package 305. In particular, the heat sink 310 is configured to conduct heat away from the LEDs even when the lighting fixture 100 is installed in an insulated ceiling environment. The heat sink 310 is composed of any material configured to conduct and/or convect heat, such as die cast metal.

Figure 7:
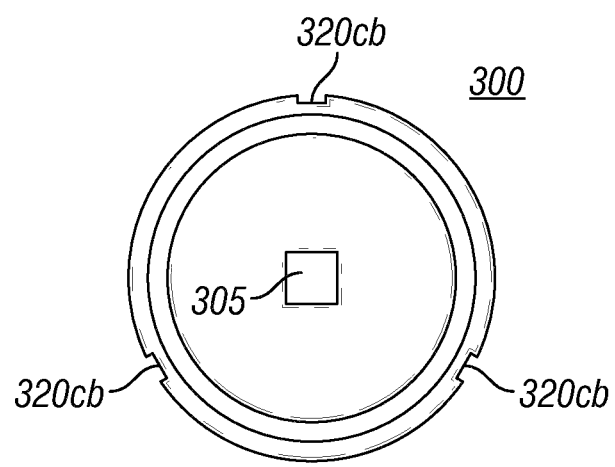
FIG. 7 is an elevational bottom view of the LED module of FIG. 3, in accordance with certain exemplary embodiments.
Figure 8:
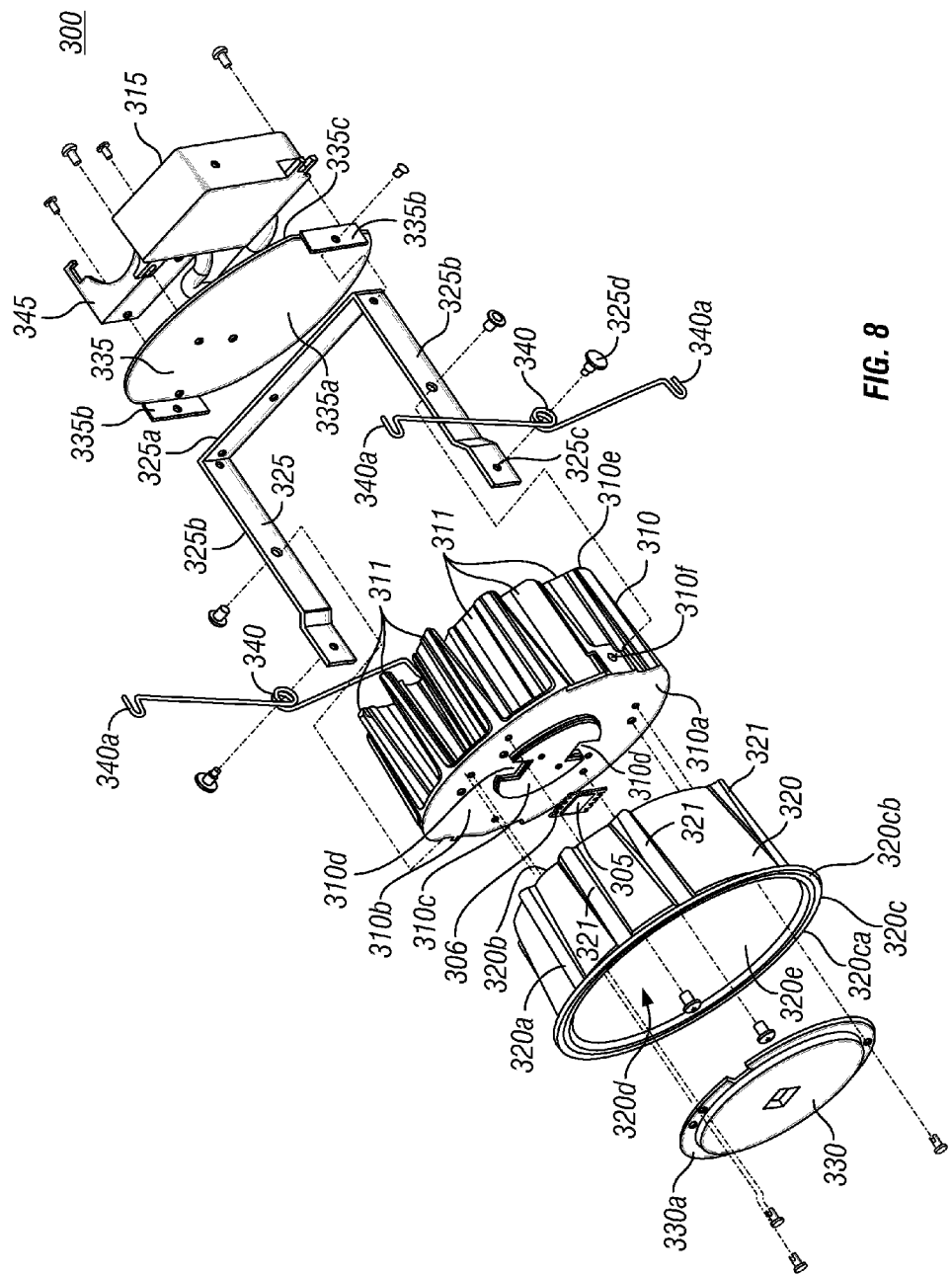
FIG. 8 is a perspective exploded side view of the LED module of FIG. 3, in accordance with certain exemplary embodiments.
Figure 9:
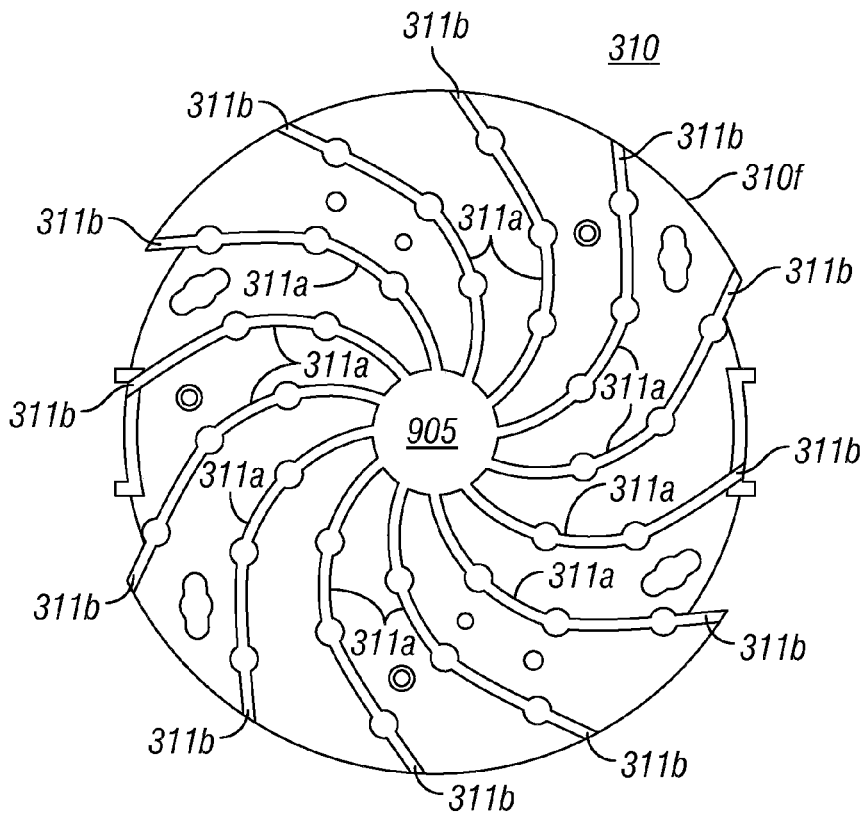
FIG. 9 is an elevational cross-sectional top view of a heat sink of the LED module of FIG. 3, in accordance with certain exemplary embodiments.
Figure 10:
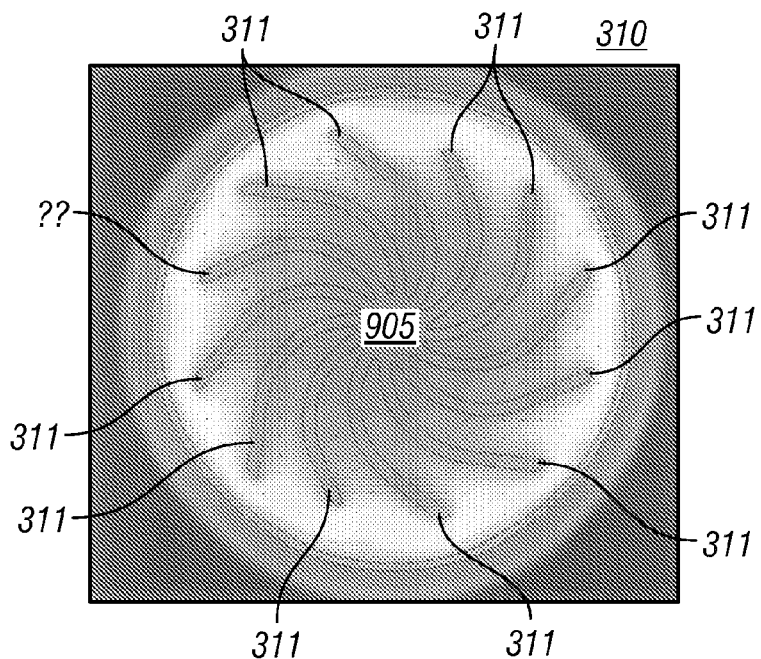
FIG. 10 illustrates a thermal scan of the heat sink of the LED module of FIG. 3, in accordance with certain exemplary embodiments.

FIG. 9 is an elevational cross-sectional top view of the exemplary heat sink 310. FIG. 10 illustrates a thermal scan of the exemplary heat sink 310 in operation. With reference to FIGS. 3-10, the bottom surface 310a of the heat sink 310 includes a substantially round member 310b with a protruding center member 310c on which the LED package 305 is mounted. In certain exemplary embodiments, the center member 310c includes two notches 310d that provide a pathway for wires (not shown) that extend between the driver 315 and the ends of the substrate 306. In certain alternative exemplary embodiments, three or more notches 310d may be included to provide pathways for wires. In certain alternative exemplary embodiments, the bottom surface 310a may include only a single, relatively flat member without any protruding center member 310c.

Fins 311 extend substantially perpendicular from the bottom surface 310a, towards a top end 310e of the heat sink 310. The fins 311 are spaced around a substantially central core 905 of the heat sink 310. The core 905 is a member that is at least partially composed of a conductive material. The core 905 can have any of a number of different shapes and configurations. For example, the core 905 can be a solid or non-solid member having a substantially cylindrical or other shape. Each fin 311 includes a curved, radial portion 311a and a substantially straight portion 311b. In certain exemplary embodiments, the radial portions 311a are substantially symmetrical to one another and extend directly from the core 905. In certain alternative exemplary embodiments, the radial portions 311a are not symmetrical to one another. Each straight portion 311b extends from its corresponding radial portion 311a, towards an outer edge 310f of the heat sink 310, substantially along a tangent of the radial portion 311a.

The radius and length of the radial portion 311a and the length of the straight portion 311b can vary based on the size of the heat sink 310, the size of the LED module 300, and the heat dissipation requirements of the LED module 300. By way of example only, one exemplary embodiment of the heat sink 310 can include fins 311 having a radial portion 311a with a radius of 1.25 inches and a length of 2 inches, and a straight portion 311b with a length of 1 inch. In certain alternative exemplary embodiments, some or all of the fins 311 may not include both a radial portion 311a and a straight portion 311b. For example, the fins 311 may be entirely straight or entirely radial. In certain additional alternative exemplary embodiments, the bottom surface 310a of the heat sink 310 may not include the round member 310b. In these embodiments, the LED package 305 is coupled directly to the core 905, rather than to the round member 310b.

As illustrated in FIG. 10, the heat sink 310 is configured to dissipate heat from the LED package 305 along a heat-transfer path that extends from the LED package 305, through the bottom surface 310a of the heat sink 310, and to the fins 311 via the core 905. The fins 311 receive the conducted heat and transfer the conducted heat to the surrounding environment (typically air in the can 115 of the lighting fixture 100) via convection. For example, heat from the LEDs can be transferred along a path from the LED package 305 to the core 905, from the core 905 to the radial portions 311a of the fins 311, from the radial portions 311a of the fins 311 to their corresponding straight portions 311b, and from the corresponding straight portions 311b to a surrounding environment. Heat also can be transferred by convection directly from the core 905 and/or the fins 311 to one or more gaps between the fins 311.

Figure 11:
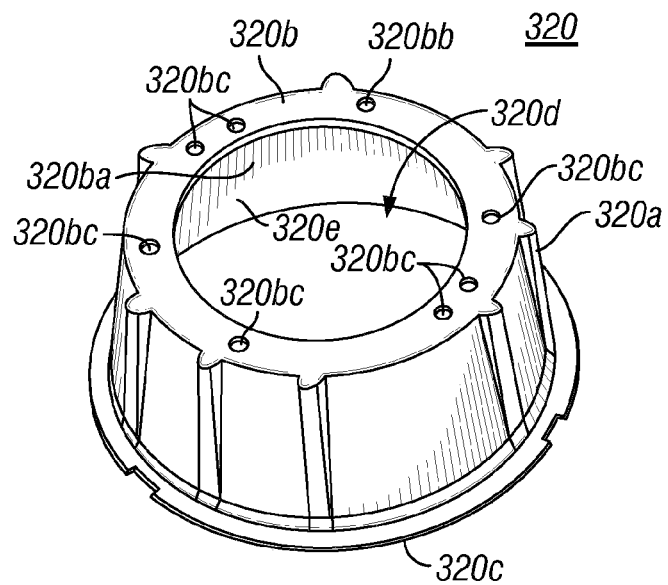
FIG. 11 is a perspective side view of a reflector housing of the LED module of FIG. 3, in accordance with certain exemplary embodiments.

In certain exemplary embodiments, a reflector housing 320 is coupled to the bottom surface 310a of the heat sink 310. A person of ordinary skill in the art will recognize that the reflector housing 320 can be coupled to another portion of the LED module 300 or the lighting fixture 100 in certain alternative exemplary embodiments. FIG. 11 illustrates the exemplary reflector housing 320. With reference to FIGS. 3-8 and 11, the reflector housing 320 includes a substantially round member 320a having a top end 320b and a bottom end 320c. Each end 320b and 320c includes an aperture 320ba and 320ca, respectively. A channel 320d extends through the reflector housing 320 and connects the apertures 320ba and 320ca.

The top end 320b includes a substantially round top surface 320bb disposed around at least a portion of the channel 320d. The top surface 320bb includes one or more holes 320bc capable of receiving fasteners that secure the reflector housing 320 to the heat sink 310. Each fastener includes a screw, nail, snap, clip, pin, or other fastening device known to a person of ordinary skill in the art having the benefit of the present disclosure. In certain alternative exemplary embodiments, the reflector housing 320 does not include the holes 320bc. In those embodiments, the reflector housing 320 is formed integrally with the heat sink 310 or is secured to the heat sink 310 via means, such as glue or adhesive, that do not require holes for fastening. In certain exemplary embodiments, the reflector housing 320 is configured to act as a secondary heat sink for conducting heat away from the LEDs. For example, the reflector housing 320 can assist with heat dissipation by convecting cool air from the bottom of the light fixture 100 towards the LED package 305 via one or more ridges 321.

Figure 12:
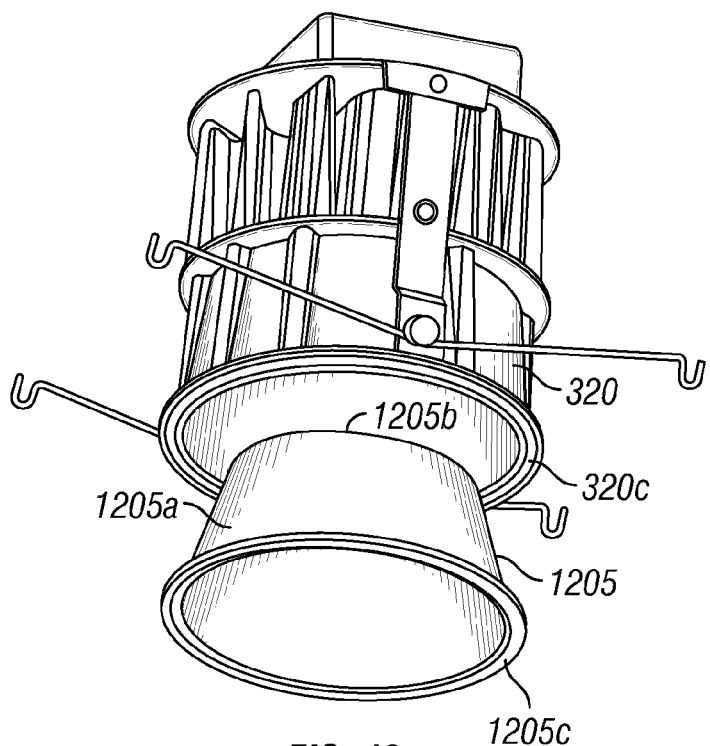
FIG. 12 is a perspective side view of a reflector being inserted in the reflector housing of FIG. 11, in accordance with certain exemplary embodiments.

The reflector housing 320 is configured to receive a reflector 1205 (FIG. 12) composed of a material for reflecting, refracting, transmitting, or diffusing light emitted by the LED package 305. The term "reflector" is used herein to refer to any material configured to serve as an optic in a light fixture, including any material configured to reflect, refract, transmit, or diffuse light. FIG. 12 is a perspective side view of the exemplary reflector 1205 being inserted in the channel 320d of the reflector housing 320, in accordance with certain exemplary embodiments. With reference to FIGS. 3-8, 11, and 12, when the reflector 1205 is installed in the reflector housing 320, outer side surfaces 1205a of the reflector 1205 are disposed along corresponding interior surfaces 320e of the reflector housing 320. In certain exemplary embodiments, a top end 1205b of the reflector 1205 abuts an edge surface 330a of an optic coupler 330, which is mounted to a bottom edge 310a of the top surface 320bb. The reflector 1205 is described in more detail below with reference to FIG. 20. The optic coupler 330 includes a member configured to cover the electrical connections at the substrate 306, to allow a geometric tolerance between the LED package 305 and the reflector 1205, and to guide light emitted by the LED package 305. The optic coupler 330 and/or a material applied to the optic coupler 330 can be optically refractive, reflective, transmissive, specular, semi-specular, or diffuse. The optic coupler 330 is described in more detail below with reference to FIGS. 17-19.

Figure 13:
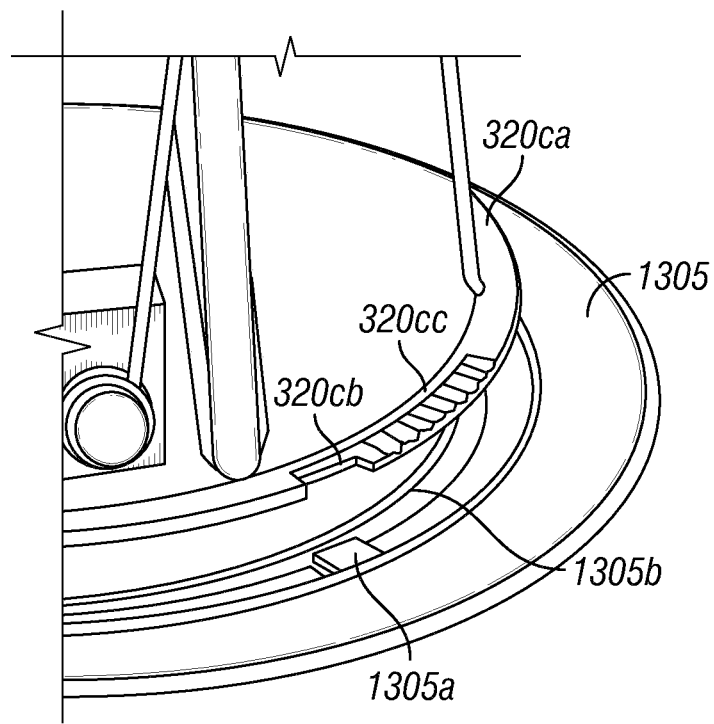
FIG. 13 is a perspective side view of a trim ring aligned for installation with the reflector housing of FIG. 11, in accordance with certain exemplary embodiments.

The bottom end 320c of the reflector housing 320 includes a bottom surface 320ca that extends away from the channel 320d, forming a substantially annular ring around the channel 320d. The surface 320ca includes slots 320cb that are each configured to receive a corresponding tab 1305a from a trim ring 1305 (FIG. 13). FIG. 13 illustrates a portion of the trim ring 1305 aligned for installation with the reflector housing 320. With reference to FIGS. 3-8 and 11-13, proximate each slot 320cb, the surface 320ca includes a ramped surface 320cc that enables installation of the trim ring 1305 on the reflector housing 320 via a twisting maneuver. Specifically, the trim ring 1305 can be installed on the reflector housing 320 by aligning each tab 1305a with its corresponding slot 320cb and twisting the trim ring 1305 relative to the reflector housing 320 so that each tab 1305a travels up its corresponding ramped surface 320cc to a higher position along the bottom surface 320ca. Each ramped surface 320cc has a height that slowly rises along the perimeter of the housing 320.

The trim ring 1305 provides an aesthetically pleasing frame for the lighting fixture 100. The trim ring 1305 may have any of a number of colors, shapes, textures, and configurations. For example, the trim ring 1305 may be white, black, metallic, or another color and may also have a thin profile, a thick profile, or a medium profile. The trim ring 1305 retains the reflector 1205 within the reflector housing 320. In particular, when the reflector 1205 and trim ring 1305 are installed in the light fixture 100, at least a portion of a bottom end 1205b of the reflector 1205 rests on a top surface 1305b of the trim ring 1305.

Referring now to FIGS. 3-8, a bracket 325 couples torsion springs 340 to opposite side surfaces 310f of the heat sink 310. The bracket 325 includes a top member 325a and opposing, elongated side members 325b that extend substantially perpendicularly from the top member 325a, towards the bottom end 320c of the reflector housing 320c. The bracket 325 is coupled to the heat sink 310 via one or more screws, nails, snaps, clips, pins, and/or other fastening devices known to a person of ordinary skill in the art having the benefit of the present disclosure.

Each side member 325b includes an aperture 325c configured to receive a rivet 325d or other fastening device for mounting one of the torsion springs 340 to the heat sink 310. Each torsion spring 340 includes opposing bracket ends 340a that are inserted inside corresponding slots (not shown) in the can 115 of the light fixture 100. To install the LED module 300 in the can 115, the bracket ends 340a are squeezed together, the LED module 300 is slid into the can 115, and the bracket ends 340a are aligned with the slots and then released such that the bracket ends 340a enter the slots.

A mounting bracket 335 is coupled to the top member 325a and/or the top end of heat sink 310 via one or more screws, nails, snaps, clips, pins, and/or other fastening devices known to a person of ordinary skill in the art having the benefit of the present disclosure. The mounting bracket 335 includes a substantially round top member 335a and protruding side members 335b that extend substantially perpendicular from the top member 335a, towards the bottom end 320c of the reflector housing 320. In certain exemplary embodiments, the mounting bracket 335 has a profile that substantially corresponds to an interior profile of the can 115. This profile allows the mounting bracket 335 to create a junction box (or "j-box") in the can 115 when the LED module 300 is installed in the light fixture 100. In particular, as described in more detail below with reference to FIG. 14, electrical junctions between the light fixture 100 and the electrical system (not shown) at the installation site may be disposed within the substantially enclosed space between the mounting bracket 335 and the top of the can 115 (the junction box), when the LED module 300 is installed.

In certain exemplary embodiments, the driver 315 and an Edison base socket bracket 345 are mounted to a top surface 350c of the top member 350a of the mounting bracket 335. Alternatively, the driver 315 can be disposed in another location in or remote from the light fixture 100. As set forth above, the driver 315 supplies electrical power and control to the LED package 305. As described in more detail below with reference to FIGS. 14-16, the Edison base socket bracket 345 is a bracket that is configured to receive an Edison base socket 1505 (FIGS. 15-16) and an Edison base adapter 1520 (FIGS. 15-16) in a retrofit installation of the LED module 300 in an existing, non-LED fixture. This bracket 345 allows the LED module 300 to be installed in both new construction and retrofit applications. In certain alternative exemplary embodiments, the bracket 345 may be removed for a new construction installation.

Figure 14:
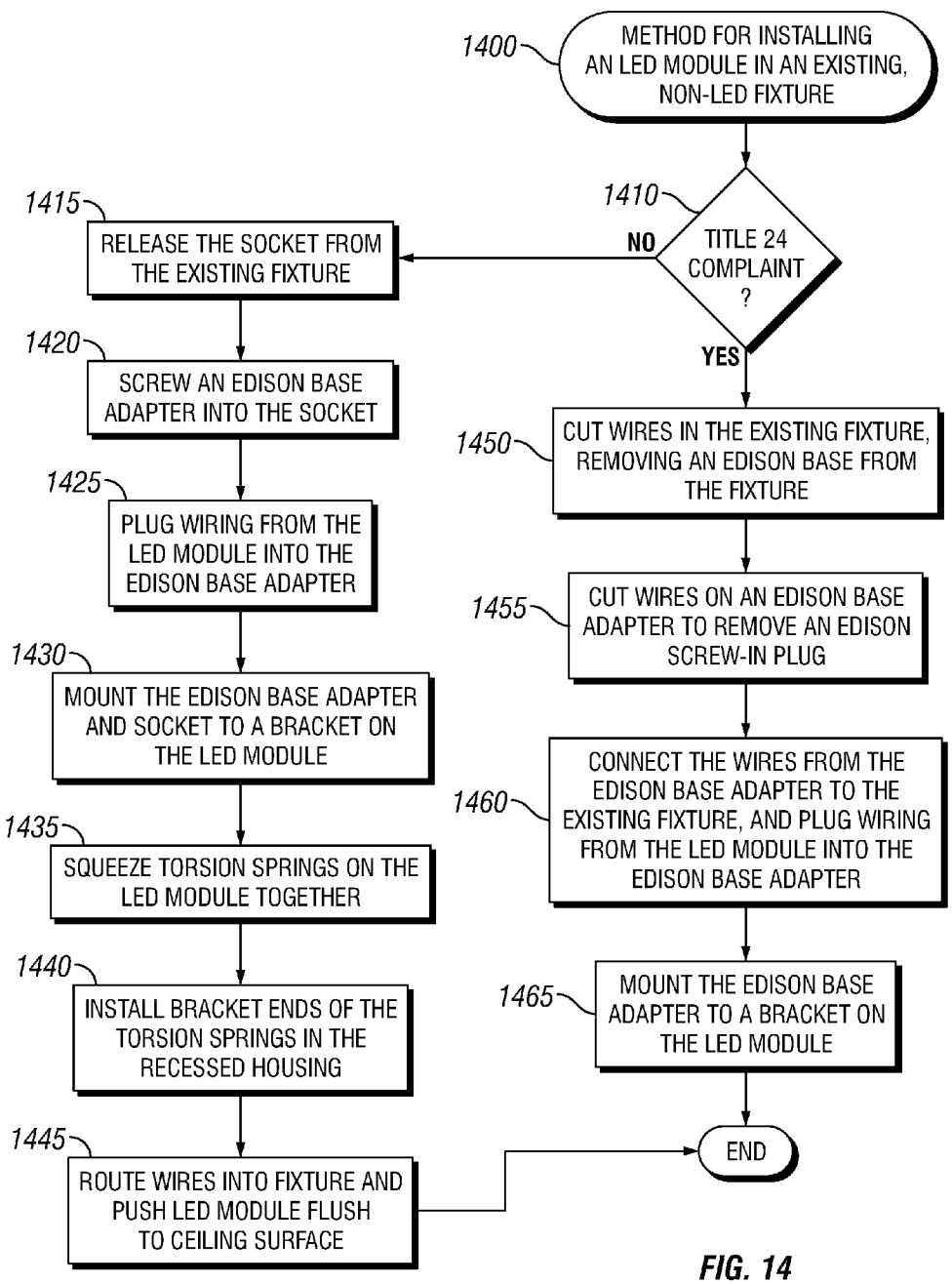
FIG. 14 is a flow chart diagram illustrating a method for installing the LED module of FIG. 3 in an existing, non-LED fixture, in accordance with certain exemplary embodiments.
Figure 15:
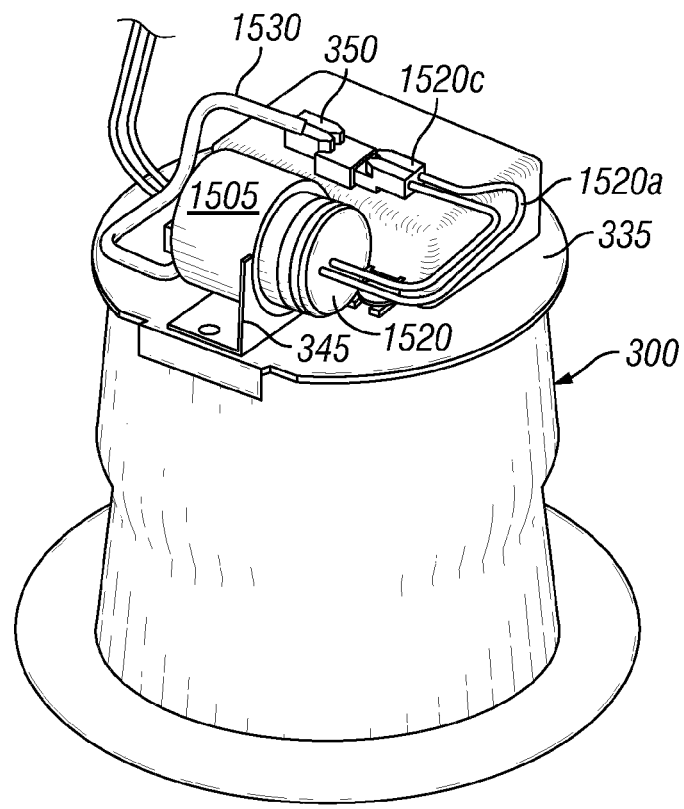
FIG. 15 is a perspective side view of the LED module of FIG. 3 connected to a socket of an existing, non-LED fixture via an Edison base adapter, in accordance with certain exemplary embodiments.
Figure 16:
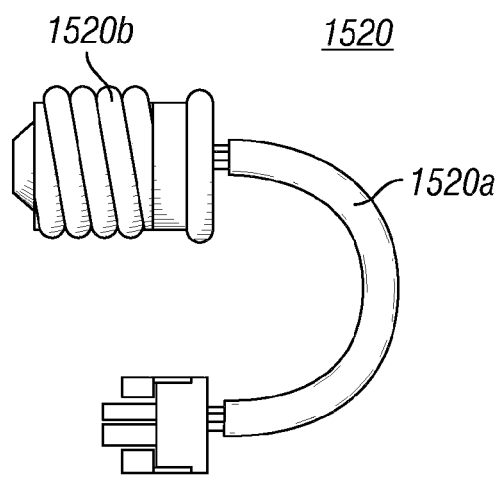
FIG. 16 is an elevational side view of the Edison base adapter of FIG. 15, in accordance with certain exemplary embodiments.

FIG. 14 is a flow chart diagram illustrating a method 1400 for installing the LED module 300 in an existing, non-LED fixture, in accordance with certain exemplary embodiments. FIGS. 15 and 16 are views of an exemplary Edison base adapter 1520 and of the LED module being 300 connected to an Edison base socket 1505 of the existing, non-LED fixture via the Edison base adapter 1520. The exemplary method 1400 is illustrative and, in alternative embodiments of the invention, certain steps can be performed in a different order, in parallel with one another, or omitted entirely, and/or certain additional steps can be performed without departing from the scope and spirit of the invention. The method 1400 is described below with reference to FIGS. 3-8 and 14-16.

In step 1410, an inquiry is conducted to determine whether the installation of the LED module 300 in the existing fixture will be compliant with Title 24 of the California Code of Regulations, titled "The Energy Efficiency Standards for Residential and Nonresidential Buildings," dated Oct. 1, 2005. Title 24 compliant installations require removal of the Edison base socket 1505 in the existing fixture. An installation that does not need to be Title 24 compliant does not require removal of the Edison base socket 1505.

If the installation will not be Title 24 compliant, then the "no" branch is followed to step 1415. In step 1415, the Edison base socket 1505 from the existing fixture is released. For example, a person can release the Edison base socket 1505 by removing the socket 1505 from a plate of the existing fixture. In step 1420, the person screws the Edison base adapter 1520 into the Edison base socket 1505. The Edison base adapter 1520 electrically couples the driver 315 of the LED module 300 to the power source of the existing fixture via the socket 1505 of the existing fixture and/or via wires connected to the socket 1505, as described below, with reference to steps 1455-1460.

In step 1425, the person plugs wiring 1530 from the LED module 300 into the Edison base adapter 1520. For example, the person can plug one or more quick-connect or plug connectors 350 from the driver 315 into the Edison base adapter 1520. Alternatively, the person may connect wires without connectors from the driver to the Edison base adapter 1520. In step 1430, the person mounts the Edison base adapter 1520 and the socket 1505 to the mounting bracket 335 on the LED module 300. For example, the person can snap, slide, or twist the Edison base adapter 1520 and socket 1505 onto the Edison base socket bracket 345 on the mounting bracket 335, and/or the person can use one or more screws, nails, snaps, clips, pins, and/or other fastening devices to mount the Edison base adapter 1520 and socket 1505 to the Edison base socket bracket 345 and/or mounting bracket 335.

In step 1435, the person squeezes the torsion springs 340 so that the bracket ends 340*a* of each torsion spring 340 move towards one another. The person slides the LED module 300 into a can 115 of the existing light fixture, aligns the bracket ends 340*a* with slots in the can 115, and releases the bracket ends 340*a* to install the bracket ends 340*a* within the can 115, in step 1440. In step 1445, the person routes any exposed wires (not shown) into the existing fixture and pushes the LED module 300 flush to a ceiling surface.

Returning to step 1410, if the installation will be Title 24 compliant, then the "yes" branch is followed to step 1450, where the person cuts wires in the existing fixture to remove the Edison base, including the Edison base socket 1505, from the existing fixture. In step 1455, the person cuts wires 1520*a* on the Edison base adapter 1520 to remove an Edison screw-in plug 1520*b* on the adapter 1520. The person connects the wires 1520*a* from the Edison base adapter 1520 to wires (not shown) in the existing fixture, and plugs wiring 1530 from the LED module 300 into a connector 1520*c* on the adapter 1520, in step 1460. These connections complete an electrical circuit between a power source at the installation site, the Edison base adapter 1520, and the LED module 300, without using an Edison base socket 1505. In step 1465, the person mounts the Edison base adapter 1520 to the mounting bracket 335 on the LED module 300, substantially as described above in connection with step 1430.

As set forth above, the mounting bracket 335 has a profile that substantially corresponds to an interior profile of the can 115. This profile allows the mounting bracket 335 to create a junction box (or "j-box") in the can 115 when the LED module 300 is installed in the light fixture 100 by substantially enclosing the space between the mounting bracket 335 and the top of the can 115. In particular, the electrical junctions between the wires 1530, the driver 315, the Edison base adapter 1520, and, depending on whether the installation is Title 24 compliant, the socket 1505, may be disposed within the substantially enclosed space between the mounting bracket 335 and the top of the can 115 when the LED module 300 is installed.

Figure 17:
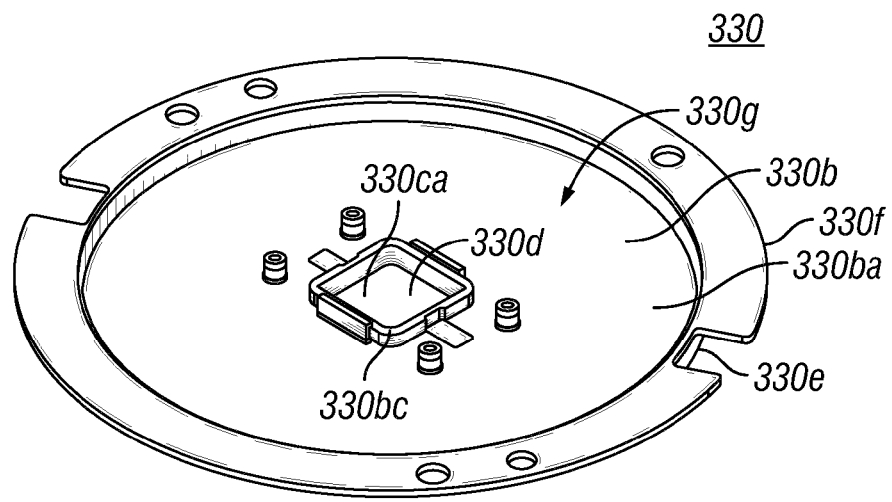
FIG. 17 is a perspective top view of an optic coupler of the LED module of FIG. 3, in accordance with certain exemplary embodiments.
Figure 18:
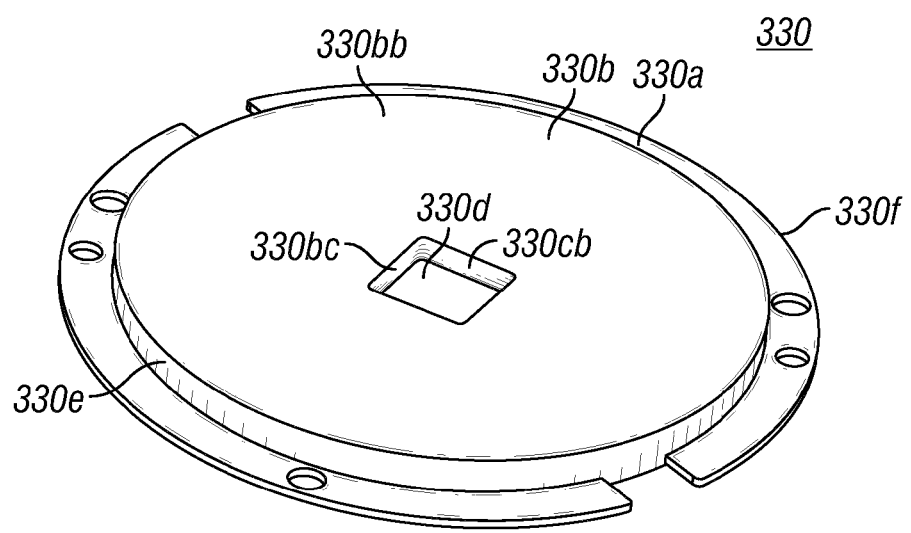
FIG. 18 is a perspective bottom view of the optic coupler of FIG. 17, in accordance with certain exemplary embodiments.

FIGS. 17 and 18 are views of the optic coupler 330 of the LED module 300, in accordance with certain exemplary embodiments. With reference to FIGS. 17 and 18, the optic coupler 330 includes a refractive, reflective, transmissive, specular, semi-specular, or diffuse member that covers the electrical connections at the substrate 306, to allow a geometric tolerance between the reflector 1205 and the LEDs in the LED package 305, and to guide light emitted by the LEDs.

In certain exemplary embodiments, the optic coupler 330 includes a center member 330*b* having a top surface 330*ba* and a bottom surface 330*bb*. Each surface 330*ba* and 330*bb* includes an aperture 330*ca* and 330*cb*, respectively. The apertures 330*ca* and 330*cb* are parallel to one another and are substantially centrally disposed in the center member 330*b*. A side member 330*bc* defines a channel 330*d* that extends through the center member 330*b* and connects the apertures 330*ca* and 330*cb*. In certain exemplary embodiments, the side member 330*bc* extends out in a substantially perpendicular direction from the top surface 330*ba*. Alternatively, the side member 330*bc* can be angled in a conical, semi-conical, or pyramidal fashion.

When the optic coupler 330 is installed in the LED module 300, the apertures 330*ca* and 330*cb* are aligned with the LEDs of the LED package 305 so that all of the LEDs are visible through the channel 330*d*. In certain exemplary embodiments, the geometry of the side member 330*bc* and/or one or both of the apertures 330*ca* and 330*cb* substantially corresponds to the geometry of the LEDs. For example, if the LEDs are arranged in a substantially square geometry, as shown in FIGS. 7 and 8, the side member 330*bc* and the apertures 330*ca* and 330*cb* can have substantially square geometries, as shown in FIGS. 17 and 18. Similarly, if the LEDs are arranged in a substantially round geometry, the side member 330*bc* and/or one or both of the apertures 330*ca* and 330*cb* can have a substantially round geometry. In certain exemplary embodiments, the optic coupler 330*d* is configured to guide light emitted by the LED package 305. For example, the emitted light can travel through the channel 330*d* and be reflected, refracted, diffused, and/or transmitted by the side member 330*bc* and/or the bottom surface 330*bb* of the center member 330*b*.

A side wall member 330*e* extends substantially perpendicularly from the top surface 330*ba* of the optic coupler 330. The side wall member 330*e* connects the center member 330*b* and an edge member 330*f* that includes the edge surface 330*a* of the optic coupler 330. The side wall member 330*e* has a substantially round geometry that defines a ring around the center member 330*b*. The edge member 330*f* extends substantially perpendicularly from a top end 330*ea* of the side wall member 330*e*. The edge member 330*f* is substantially parallel to the center member 330*b*.

The side wall member 330*e* and center member 330*b* define an interior region 330*g* of the optic coupler 330. The interior region 330*g* includes a space around the aperture 330*ca* that is configured to house the electrical connections at the substrate 306. In particular, when the optic coupler 330 is installed within the LED module 300, the optic coupler 330 covers the electrical connections on the substrate 306 by housing at least a portion of the connections in the interior region 330*g*. Thus, the electrical connections are not visible when the LED module 300 is installed.

Figure 19:
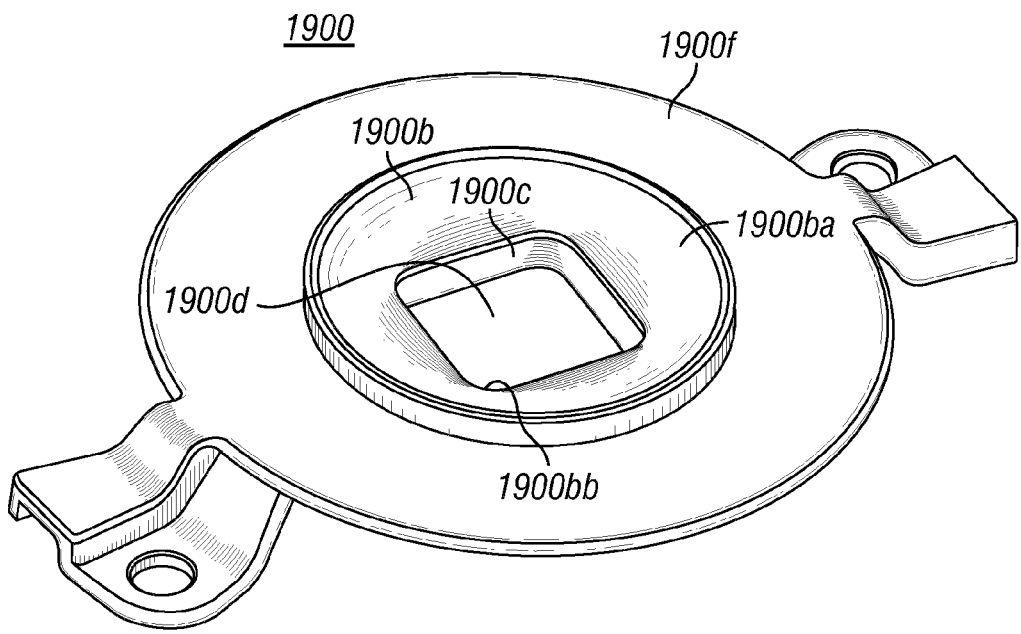
FIG. 19 is a perspective top view of an optic coupler of the LED module of FIG. 3, in accordance with certain alternative exemplary embodiments.

FIG. 19 is a perspective top view of an optic coupler 1900 of the LED module 300, in accordance with certain alternative exemplary embodiments. The optic coupler 1900 is substantially similar to the optic coupler 330, except that the optic coupler 1900 has a wider edge member 1900*f* and a narrower center member 1900*b* that has a substantially conical or frusto-conical geometry. In particular, a bottom surface 1900*ba* of the center member 1900*b* has a larger radius than a top surface 1900*bb* of the center member 1900*b*. Each surface 1900*ba* and 1900*bb* includes an aperture 1900*ca* and 1900*cb*, respectively, that connects a channel 1900*d* extending through the center member 1900*b*. The bottom surface 1900*ba* has a substantially angled profile that bows outward from the channel 1900*d*, defining the substantially conical or frusto-conical geometry of the center member 1900*b*. In certain exemplary embodiments, the geometry of the center member 1900*b* can reduce undesirable shadowing from the optic coupler 1900. In particular, the center member 1900*b* does not include sharp angled edges that could obstruct light from the LED package 305.

Although FIGS. 17-18 and 19 illustrate center members 330*b* and 1900*b* with square and conical geometries, respectively, a person of ordinary skill in the art having the benefit of the present disclosure will recognize that the center members 330*b* and 1900*b* can include any geometry. For example, in certain alternative exemplary embodiments, the optic coupler 300 or 1900 can include a center member that incorporates a hemispherical or cylindrical geometry.

Figure 20:
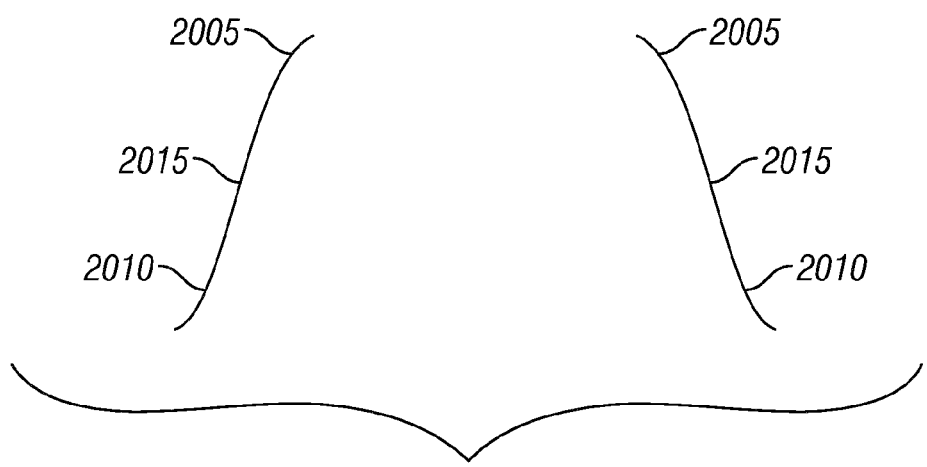
FIG. 20 is an exaggerated depiction of a profile of the reflector, in accordance with certain exemplary embodiments.

FIG. 20 is an exaggerated depiction of a cross-sectional profile of the reflector 1205, in accordance with certain exemplary embodiments. The profile includes a first region 2005 at the top of the reflector 1205 and a second region 2010 at the bottom of the reflector 1205. The second region 2010 is more diverging than the first region 2005. The regions 2005 and 2010 define a curve that resembles the shape of a side of a bell.

As is well known to a person of ordinary skill in the art having the benefit of the present disclosure, reflectors within a downlight need to create a specific light pattern that is pleasing to the eye, taking into account human visual perception. Most visually appealing downlights are designed such that the reflected image of the source light begins at the top of the reflector and works its way downward as an observer walks toward the fixture. This effect is sometimes referred to as "top down flash." It is generally accepted that people prefer light distributions that are more or less uniform, with smooth rather than abrupt gradients. Abrupt gradients are perceived as bright or dark bands in the light pattern.

Traditional reflector designs for downlights with large sources, such as incandescent or compact fluorescent lamps, are fairly straightforward. A parabolic or nearly parabolic section created from the edge rays or tangents from the light source will create a top down flash with the widest distribution possible with given perception constraints. With respect to the light pattern on a nearby surface, such as a floor, the light pattern is generally smooth due to the fact that the large source is reflected into a large, angular zone.

Designing a reflector for a small light source, such as an LED, is not as straightforward. In particular, it has traditionally been difficult to create a smooth light pattern when using an LED source. The reflector for a small source downlight, such as an LED downlight 100, needs to be more diverging than is typical with downlights having larger sources. The reflected portion of the light, nearest nadir, or the point directly below the light fixture, is the most critical area for a small source downlight. If the transition between the reflector image and the bare source alone is abrupt in the downlight, a bright or dark ring will be perceived in the light pattern.

To compensate, the reflector 1205 of the present invention becomes radically diverging near this zone to better blend the transition area. In particular, the bell-shape of the profile of the reflector 1205 defines at least one smooth curve with a substantially centrally disposed inflection point. A top portion of the curve (the first region 2005), reflects light in a more concentrated manner to achieve desired light at higher angles. For example, the top portion of the curve can reflect light near the top of the reflector 1205 starting at about 50 degrees. A bottom portion of the curve (the second region 2010) is more diverging than the top portion and reflects light over a large angular zone (down to zero degrees), blending out what would otherwise be a hard visible line in the light pattern. This shape has been show to meet the requirement of a top-down flash while also creating a smooth, blended light pattern in the LED downlight fixture 100. Although particularly useful for LED downlights, a person of ordinary skill in the art having the benefit of the present disclosure will recognize that the design of the reflector 1205 may be used in any type of fixture, whether LED-based or not.

The precise shape of the reflector 1205 can depend on a variety of factors, including the size and shape of the light source, the size and shape of the aperture opening, and the desired photometric distribution. In certain exemplary embodiments, the shape of the reflector 1205 can be determined by defining a number of vertices and drawing a spline through the vertices, thereby creating a smooth, continuous curve that extends through the vertices. Although it might be possible to approximate this curve with an equation, the equation would change depending on a given set of variables. In one exemplary reflector 1205, the vertices of the spline were determined in a trial and error methodology with optical analysis software to achieve a desired photometric distribution. The variables set at the onset of the design were: the diameter of the aperture (5 inches), the viewing angle an observer can first see the light source or interior of the optical coupler through the aperture as measured from nadir, directly below the fixture (50 degrees), and the cutoff angle of the reflected light from the reflector as measured from nadir, directly below the fixture (50 degrees).

Figure 21:
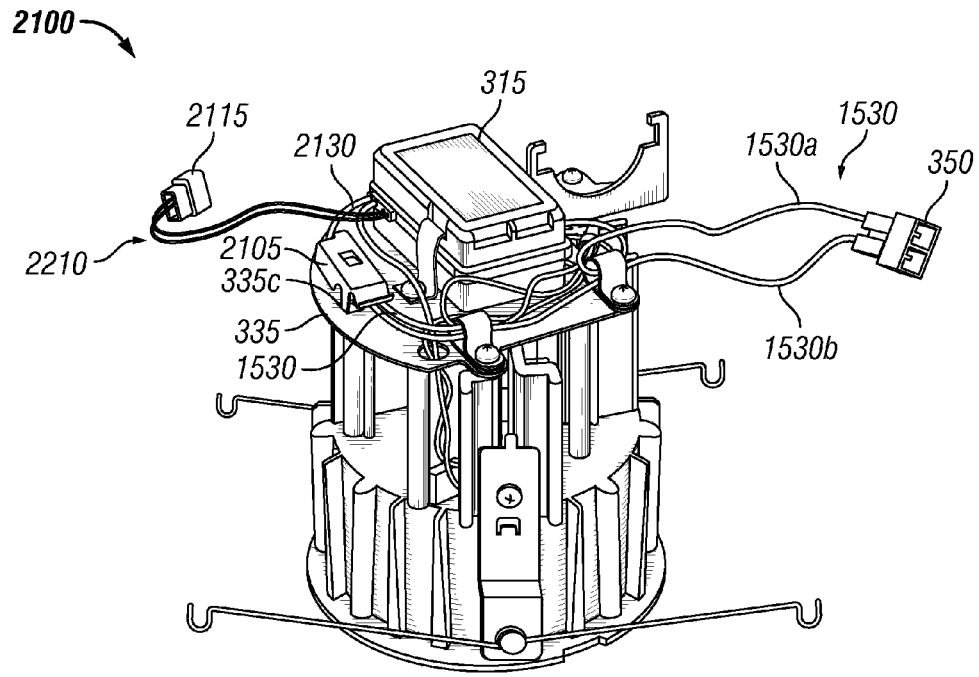
FIG. 21 is a perspective top view of a thermally protected LED module of a recessed lighting fixture, in accordance with certain exemplary embodiments.
Figure 22:
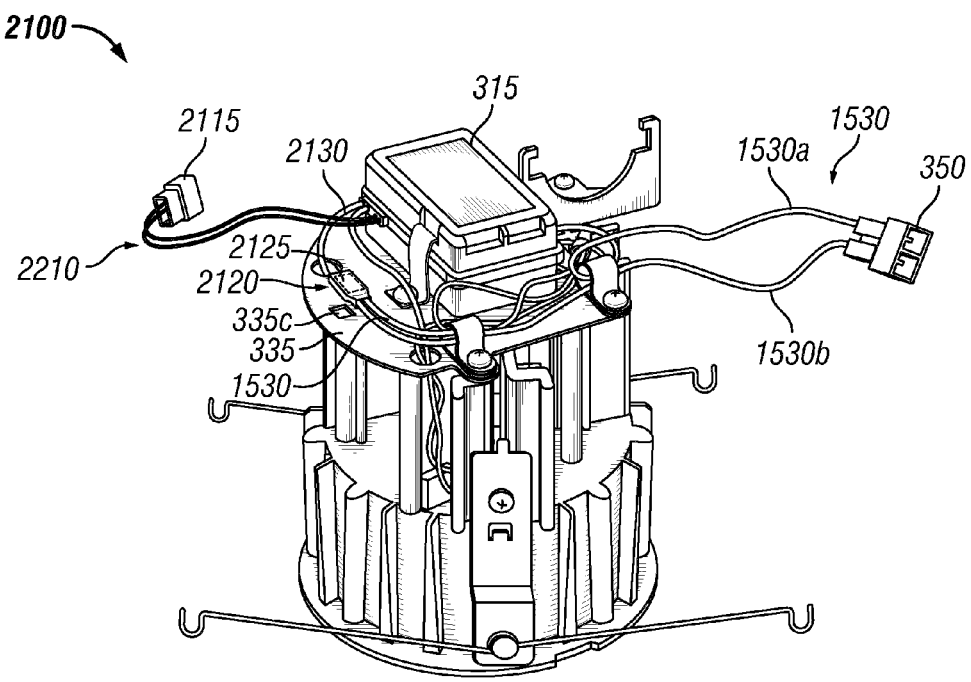
FIG. 22 is a perspective side view of the LED module of FIG. 21, with the thermal protector cover removed, in accordance with certain exemplary embodiments.

FIG. 21 is a perspective view of an exemplary LED module 2100 for use in conjunction with the recessed lighting fixture 100 of FIG. 1. FIG. 22 is a perspective side view of the exemplary LED module 2100 with a thermal protector cover 2105 removed. Referring now to FIGS. 21 and 22, the exemplary LED module 2100 is configured to be installed within the can 115 of the lighting fixture 100 of FIG. 1. The LED module 2100 is suitable for both new installation and for use in retrofit applications. The LED module 2100 is the same as that described above with regard to FIGS. 3-8, except as specifically stated below, and for the sake of brevity will not be repeated herein.

The LED module 2100 includes line voltage wiring 1530 and low voltage wiring 2110. In certain exemplary embodiments, the low voltage wiring 2110 includes a connector 2115 at an end thereof that is electrically coupled, via intermediate wiring (not shown), to a dimmer or other type of switch (not shown) or other low voltage system. Alternatively the low voltage wiring 2110 is coupled to the intermediate wiring by way of a twisted pair or other known wire coupling method. The line voltage wiring 1530 is coupled to the connector 350 at an end thereof for plugging into an Edison base adapter as described with respect to FIG. 15, or other power source (not shown). Alternatively, in new construction applications, the Edison adapter is replaced with a male connector of the power source. The line voltage wiring 1530 includes a common wire 1530a electrically coupled to the LED driver 315, and a hot wire 1530b electrically coupled to an input of the thermal protector 2120 (FIG. 22). In one exemplary embodiment, the line voltage is 120V/60 Hz. In alternative embodiments, the line voltage is any one of 240V/50 Hz, 250V/50 Hz or any other line voltage standard known to those of ordinary skill in the art. A wire 1530c is coupled to an output of the thermal protector 2120 at one end, and to the driver 315 at an opposing end, thereby creating a circuit from the connector 350 to the driver 315.

In certain exemplary embodiments, the thermal protector 2120 is a thermal switch that is mounted to and senses the temperature of the mounting bracket 335. In certain alternative embodiments, the thermal protector 2120 is a floating thermal switch that senses the temperature proximate the mounting bracket 335 and/or the LED driver 315. In certain other embodiments, the thermal protector 2120 is a thermal switch that is mounted to and senses the temperature of the driver 315. One having ordinary skill in the art will recognize that the thermal protector 2120 can monitor the temperature of or proximate other components, as long as the thermal protector 2120 is configured to trip before the LED driver 315 reaches its thermal limit. Examples of thermal switches include, but are not limited to, automatic reset bi-metal switches. The thermal switch may be a bimetallic strip, often encased in a tubular glass bulb to protect it from dust or short circuit, that bends one way if heated to open the circuit, and in the opposite direction to close the circuit if cooled below its normal temperature. Generally, the thermal protector 2120 has a thermal rating, or designated threshold temperature, at which the circuit opens. The thermal protectors 2120 include thermal switches with varying designs of the bimetal switch, selection of bimetal materials, and deflection distance of the bimetal at varying temperature. In certain exemplary embodiments, an insulating sleeve 2125 surrounds the thermal protector 2120 and prevents the thermal protector 2120 from contacting other metallic components of the LED module 2100 and shorting the circuit. In certain exemplary embodiments, the insulating sleeve 2125 is a plastic cover.

In the event that the LED module 2100 is operating and the thermal protector 2120 senses a temperature (on the device it is mounted to or near (depending upon whether it is fixed or floating)) at and/or greater than a designated threshold temperature, the thermal protector 2120 opens the circuit and stops the flow of electricity to the LED driver 315, thereby removing the power being supplied via wiring 2130 to the LEDs (not shown) in the LED module 2100. In certain exemplary embodiments where the thermal protector 2120 is coupled to or floating next to the outer surface of the LED driver 315, when the temperature of the outer housing of the LED driver 315 is at or exceeds a designated threshold temperature, the thermal protector 2120 opens the circuit and stops the flow of electricity to the LED driver 315. In certain alternative embodiments where the thermal protector 2120 is coupled to or floating next to the surface of the mounting bracket 335, when the temperature of the surface of the mounting bracket 335 is at or exceeds a designated threshold temperature, the thermal protector 2120 opens the circuit and stops the flow of electricity to the LED driver 315. In certain exemplary embodiments, the designated threshold temperature is about 10 degrees Celsius below the maximum operating temperature of the LED driver 315. In some instances, the maximum operating temperature of the LED driver 315 ranges from 94 to 101 degrees Celsius. In certain exemplary embodiments, the designated threshold temperature is equal to the maximum operating temperature of the LED driver 315. In alternative embodiments, the designated threshold temperature is anywhere between 0-30 degrees below the maximum operating temperature of the LED driver 315. In certain exemplary embodiments, the designated threshold temperature is less than the activation temperature of an internal overprotection device (not shown) of the LED driver 315. When the maximum operating temperature of the LED driver 315 is reached, the overprotection device generally causes flashing of the LEDs to begin cooling down of the LED driver 315, but does not cut off power completely. Therefore, the LED driver 315 may still be damaged when exposed to a power supply in high temperatures. However, the thermal protector 2120 cuts off power to the LED driver 315 completely prior to the LED driver 315 reaching a temperature to activate the overprotection device, thereby preventing damage to the LED driver 315. In certain exemplary embodiments, the designated threshold temperature is about 14 degrees Celsius below the activation temperature of the overprotection device of the driver 315. In alternative embodiments, the designated threshold temperature is anywhere between 10-15 degrees below the activation temperature for the overprotection device of the LED driver 315. In alternative embodiments, the designated threshold temperature is anywhere between 0-30 degrees below the activation temperature for the overprotection device of the LED driver 315. One having ordinary skill in the art will recognize that the designated threshold temperature can vary based on the position of the thermal protector 2120 on the LED module 2100 and the operating parameters of the LED module 2100. When the temperature sensed by the thermal protector 2120 is within operating parameters again, the thermal protector 2120 closes the circuit and allows current flow to the driver 315 to supply power to the LEDs via wiring 2130.

Figure 23:
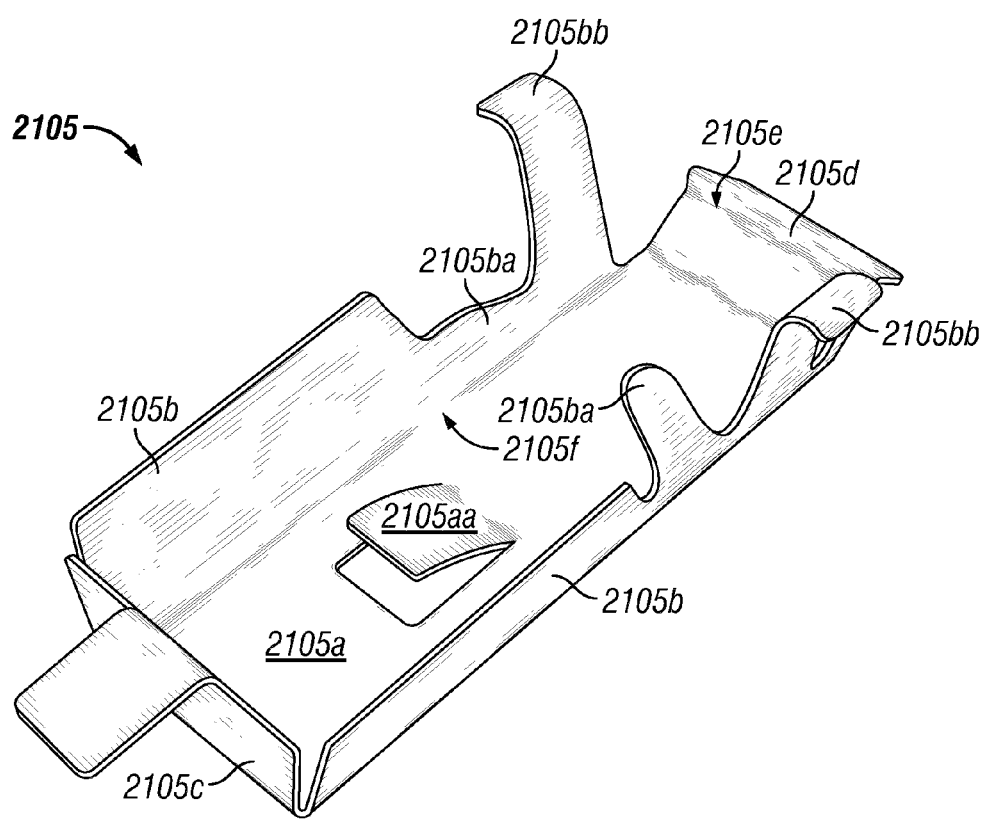
FIG. 23 is a perspective bottom view of a thermal protector cover for the thermal protector, in accordance with certain exemplary embodiments.

FIG. 23 is a perspective bottom view of the thermal protector cover 2105. Referring to FIGS. 21-23, the LED module 2100 further includes the thermal protector cover 2105 coupled to the mounting bracket 335 and at least partially enclosing the thermal protector 2120. The thermal protector cover 2105 includes a rectangular-shaped base wall 2105a, two opposing side walls 2105b and a back wall 2105c extending substantially orthogonally from the base wall 2105a, and a wall 2105d opposing the back wall 2105c and extending at an angle away from the base wall 2105a to create a passageway 2105e. The base wall 2105a, side walls 2105b, back wall 2105c, and wall 2105d define a cavity 2105f within which the thermal protector 2120 is positioned. The wires 1530b, 1530c extend from the cavity 2105f to the exterior of the thermal protector cover 2105 through the passageway 2105e. The base wall 2105a includes an angled tab 2105aa and the side walls 2105b each include angled tabs 2105ba for securing the thermal protector 2120 within the cavity 2105f. In certain exemplary embodiments, the angled tab 2105aa acts as or similar to a leaf spring and applies a pressure sufficient to maintain contact between the thermal protector 2120 and the mounting bracket 335, or other surface that the thermal protector 2120 monitors the temperature thereof. Each of the side walls 2105b also include locking tabs 2105bb for mating with corresponding grooves 335c in the mounting bracket 335 to secure the thermal protector cover 2105 to the mounting bracket 335. The back wall 2105c also includes a tab 2105ca that applies a force to the thermal protector 2120 to insure that contact with the mounting bracket 335 is maintained. In alternative embodiments, the thermal protector cover 2105 is secured to the mounting bracket 335, or other surface to be monitored, by any means deemed suitable by one having ordinary skill in the art. In certain exemplary embodiments, the thermal protector cover 2105 is constructed of aluminum. In alternative embodiments, the thermal protector cover 2105 is constructed of plastic, such as nylon. Therefore, the thermal protector cover 2105 holds the thermal protector 2120 in place, while preventing accidental damage to the thermal protector 2120.

To facilitate a better understanding of the present invention, the following examples of certain aspects of some exemplary embodiments are given. In no way should the following examples be read to limit, or define, the scope of the invention.

EXAMPLE

LED modules, as described with respect to FIGS. 21-22, having an automatic reset thermal switch positioned on the mounting bracket were tested to determine whether the LED modules can operate safely and effectively using various trims under varying conditions. The trim is the visible portion of the light fixture, and is the insert that is seen when looking up into the fixture, and also includes the thin lining around the edge of the light fixture. The thermal switches used in the tests are commercially available from Sensata Technologies, Inc. All of the tests utilized a thermal switch with a catalog number of 7AM023A5, with a thermal rating, or designated threshold temperature, of 80 degrees Celsius, except in test #2 in Table 1 below. In that test, a thermal switch having a catalog number of 7AM038A5, with a thermal rating of 155 degrees Celsius was used. LED modules having 25 watt (W) LEDs were supplied with a line voltage of about 120 volts (V). Some of the LED modules were placed within a test box, with or without insulation, and tested. Thermocouples monitored the temperature at varying positions (about 30 positions) on the LED module. The temperatures were monitored under two conditions: (1) the temperature was monitored until the thermal protectors tripped when the temperature reached 80 degrees Celsius raw reading/77 degrees Celsius adjusted reading (or 155 degrees Celsius in test #2), if the thermal protectors tripped within three hours, or (2) the temperature was monitored for up to seven and half hours if the components of the LED module stayed below their maximum operating temperature, or maximum rated value. In some tests, a timer was not used and thereby required manual termination. The results of the testing are shown in Table 1 below.

TABLE 1

Results of Thermal Testing of LED Modules

| # | Trim Used (Cooper Industries Catalog No.) | Insulation Depth (inch) | Test Box Used | Adjusted Ambient Temperature (degrees Celsius) | Final Adjusted Temperature Reading by Thermal Switch (degrees Celsius) | Test Duration (hours) | Reason for Ending |
|---|---|---|---|---|---|---|---|
| 1 | 494SC06 | 8 | Yes | 25 | 77 | 2.39 | Thermal protector tripped |
| 2 | 493TBZS06 | 6 | Yes | 25 | 75 | 7.52 | Specified time reached |
| 3 | 493TBZS06 | None | Yes | 25 | 69 | 7.5 | Specified time reached |
| 4 | 493TBZS06 | None | No | 40 | 69 | 17.52 | Manual termination |
| 5 | 493BBS06 | None | No | 40 | 68 | 22.07 | Manual termination |
| 6 | 493HS06 | None | No | 40 | 68 | 46.28 | Manual termination |
| 7 | 493SCS06 | None | No | 40 | 68 | 16.97 | Manual termination |
| 8 | 493SNS06 | None | No | 40 | 70 | 7.5 | Specified time reached |
| 9 | 493WBS06 | None | No | 40 | 68 | 7.5 | Specified time reached |

The results of the tests indicate that the present invention is suitable for use with a variety of trims in varying conditions. The thermal switch tripped within the specified time frame if the temperature monitored by the thermal switch reached the designated thermal rating for the thermal switch, while the LED module continued to operate when the temperatures monitored remained below the thermal rating.

Although specific embodiments of the invention have been described above in detail, the description is merely for purposes of illustration. It should be appreciated, therefore, that many aspects of the invention were described above by way of example only and are not intended as required or essential elements of the invention unless explicitly stated otherwise. For example, the present invention could be used on a non-LED device having a driver or ballast. Various modifications of, and equivalent steps corresponding to, the disclosed aspects of the exemplary embodiments, in addition to those described above, can be made by a person of ordinary skill in the art, having the benefit of this disclosure, without departing from the spirit and scope of the invention defined in the following claims, the scope of which is to be accorded the broadest interpretation so as to encompass such modifications and equivalent structures.

What is claimed is:

1. A light emitting diode ("LED") module, comprising:
    an LED driver; and
    a thermal protector electrically coupled to the LED driver, the thermal protector configured to be electrically coupled to a power source and to create a circuit from the driver through the thermal protector and to the power source, wherein the thermal protector comprises a thermal rating;
    wherein the thermal protector is configured to open the circuit and electrically disconnect the power source from the driver when the thermal rating is reached.

2. The LED module of claim 1, further comprising a mounting bracket upon which the LED driver, the thermal protector, or both, are mounted, wherein the thermal protector is proximate to at least one of the driver and the mounting bracket.

3. The LED module of claim 2, wherein the thermal protector senses a temperature of the LED driver, the mounting bracket, or both.

4. The LED module of claim 1, further comprising an LED and a heat sink thermally coupled to the LED, wherein the thermal protector is proximate to at least the LED, the heat sink, or both, and wherein the thermal protector senses a temperature of the LED, the heat sink, or both.

5. The LED module of claim 1, wherein the thermal protector is an automatic reset thermal switch.

6. A light emitting diode ("LED") module, comprising:
    a driver; and
    a thermal switch electrically coupled to the driver and a power source, wherein the thermal switch is electrically disposed between the power source and the driver in a series circuit;
    wherein upon activation of the thermal switch, the circuit transitions from a closed circuit to an open circuit at the thermal switch, thereby preventing electrical power from the power source from being provided to the driver.

7. The LED module of claim 6, further comprising a mounting bracket upon which the LED driver, the thermal switch, or both, are mounted.

8. The LED module of claim 6, wherein the thermal switch is an automatic reset thermal switch.

9. The LED module of claim 7, wherein the thermal switch is proximate to at least one of the driver and the mounting bracket.

10. The LED module of claim 9, wherein the thermal switch is coupled to a thermal sensor, in which the thermal sensor senses a temperature of the driver, the mounting bracket, or both.

11. The LED module of claim 10, wherein the thermal switch is activated when the temperature reaches or exceeds a thermal rating.

12. The LED module of claim 11, wherein the thermal switch is reset when the temperature falls to or below a reset threshold, wherein when the thermal switch is reset, the circuit transitions from an open circuit to a closed circuit.

13. A lighting module, comprising:
   a light emitting diode ("LED") module, the LED module comprising:
      at least one LED;
      a driver supplying power from a power source to the at least one LED; and
      an automatic reset thermal switch electrically coupled to the driver, wherein the automatic reset thermal switch has an activation temperature, wherein upon reaching or exceeding the activation temperature, the thermal switch opens a circuit and electrically terminates power transmission at the driver.

14. The lighting module of claim 13, wherein the automatic reset thermal switch is electrically coupled between the driver and the power source.

15. The lighting module of claim 13, wherein upon reaching or exceeding the activation temperature, the automatic reset thermal switch opens a circuit and electrically terminates power transmission from the power source to the driver.

16. The lighting module of claim 13, wherein the LED module further comprises a mounting portion configured to mount the LED module within a housing.

17. The lighting module of claim 13, wherein the automatic reset thermal switch has a reset temperature, wherein upon falling to or below the reset temperature, the thermal switch closes the circuit and resumes power transmission at the driver.

18. The lighting module of claim 13, wherein the activation temperature is in a range from about 0 to 30 degrees Celsius below a maximum operating temperature of the LED driver.

19. The LED module of claim 13, further comprising at least one of an insulating sleeve disposed about at least a portion of the thermal protector or a thermal protector cover coupled to the LED module.

20. The LED module of claim 19, wherein the thermal protector cover comprises at least one tab, wherein the at least one tab applies a force on the thermal protector sufficient to maintain physical contact between the thermal protector and a surface of the LED module.

\* \* \* \* \*